F. W. DOBBEL.
SHIPPING RECEPTACLE.
APPLICATION FILED SEPT. 12, 1916.
1,236,918.
Patented Aug. 14, 1917.
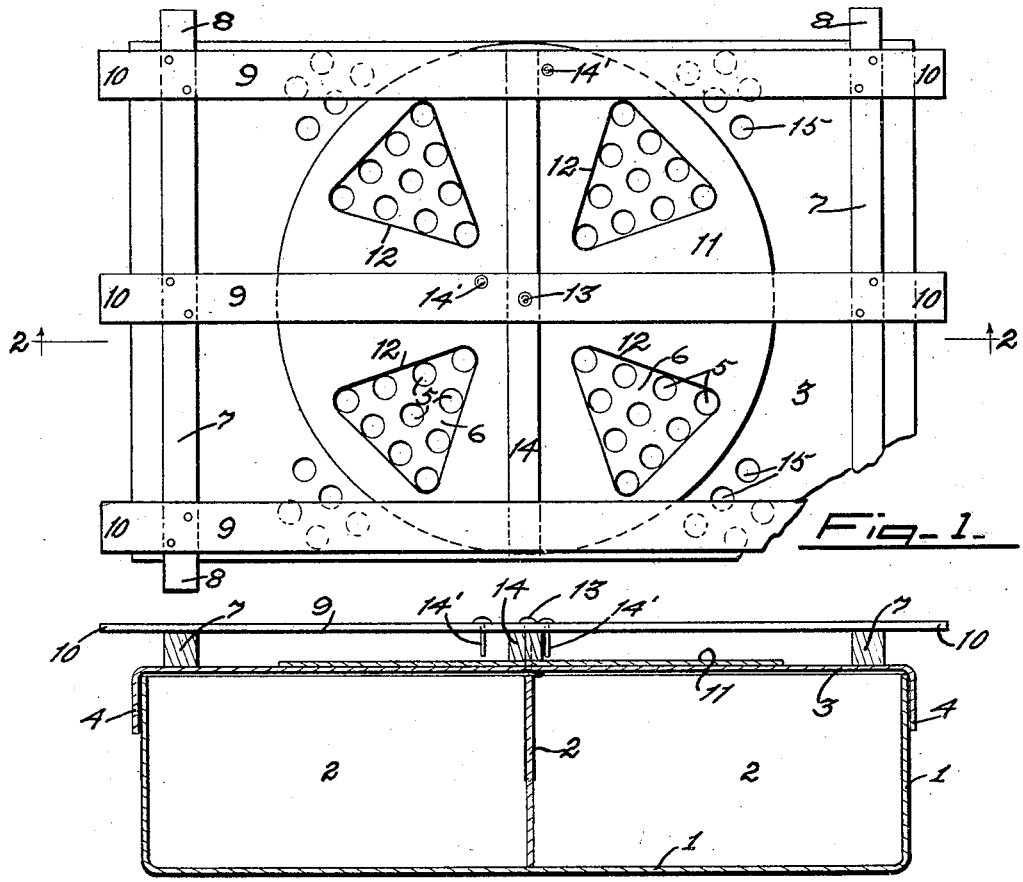
Fig. 1.
Fig. 2.
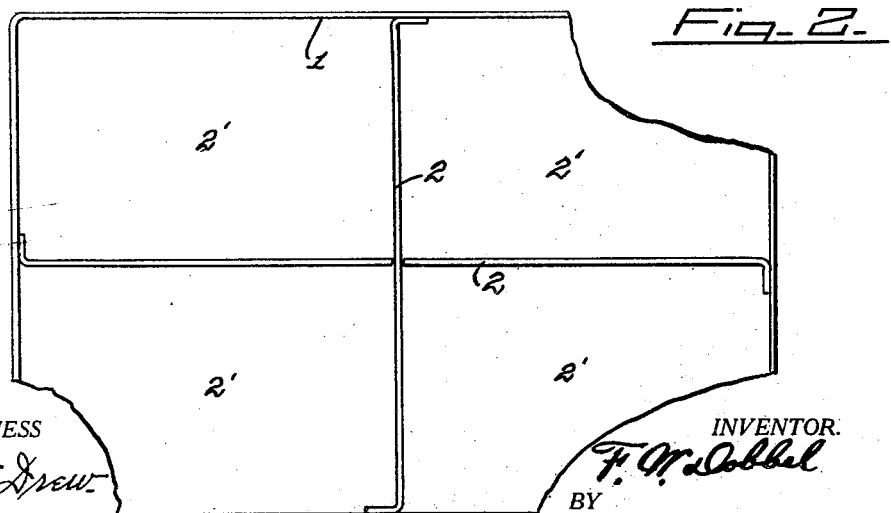
Fig. 3.
WITNESS
Wm F. Drew
INVENTOR.
F. W. Dobbel
BY
Acorn & Tilton
ATTORNEYS

UNITED STATES PATENT OFFICE.

FREDERICK W. DOBBEL, OF SONOMA, CALIFORNIA.

SHIPPING-RECEPTACLE.

1,236,918.   Specification of Letters Patent.   Patented Aug. 14, 1917.

Application filed September 12, 1916. Serial No. 119,667.

*To all whom it may concern:*

Be it known that I, FREDERICK W. DOBBEL, a citizen of the United States, residing at Sonoma, in the county of Sonoma and State of California, have invented certain new and useful Improvements in Shipping-Receptacles, of which the following is a specification.

In the shipping of poultry, especially the very young which has been recently hatched, considerable financial losses are often suffered, due to the loss of poultry through overheating or suffocation occasioned by insufficient air or from undue exposure during transportation.

The present invention relates to a shipping box or receptacle, particularly adapted for transporting young poultry, and the same is designed for preventing the positioning of other receptacles, articles or packages in close contact with the walls thereof, and which would endanger the supply of air sufficient for the poultry, thus insuring an air space around the receptacle at all times, and providing an air supply to the poultry contained therein. Another object of the invention is to provide a receptacle having means capable of adjustment and for controlling the air supply to the interior thereof, whereby the air supply may be readily regulated. Other objects are to provide a light weight, inexpensive shipping receptacle for the above purpose, capable of withstanding rough usage, and one wherein the means for preventing the placing of other receptacles, packages or articles in contact with the walls thereof, serves as a reinforcement or strengthening means.

The invention consists broadly in a receptacle having a removable cover provided with vent openings controllable by an adjustable damper and having projections at the sides, ends, and above the receptacle, which will prevent the positioning of packages or articles in contact with the walls thereof, and which would endanger the air circulation to the interior of the receptacle.

With the above mentioned and other objects in view, the invention consists in the novel construction and combination of parts hereinafter described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

To more fully comprehend the invention reference is directed to the accompanying drawings, wherein:

Figure 1 is a view in top plan of the preferred embodiment of my invention.

Fig. 2 is a sectional view taken on line 2—2 of Fig. 1, and viewed in the direction of the arrows.

Fig. 3 is a plan view of the receptacle with the cover removed, illustrating the pens or compartments in the interior thereof.

Referring more particularly to the several views of the drawings, wherein like characters of reference designate corresponding parts, 1 indicates an open topped box or receptacle, preferably constructed of heavy paper board, and the same is preferably divided on its interior by the intersecting walls 2, into compartments or pens 2'. A removable cover 3 having the turned edges 4 for projecting a slight distance over the side walls of the receptacle 1, is adapted to close the open top thereof. The cover 3 is provided with a plurality of perforations or vent openings 5, arranged preferably in triangular groups 6 adjacent the center thereof, and one of said groups of openings is adapted to be positioned over one of said compartments or pens 2' when the cover is positioned on the receptacle.

To strengthen the cover 3 of the receptacle, and to prevent the placing of packages or articles to close the circulation of air to the vent openings 5, and to prevent the placing of packages or articles in contact with the receptacle side walls, suitable means are provided, and the same preferably comprises a frame consisting of the transverse end members 7, mounted in any suitable manner preferably to the exterior of the cover adjacent the ends thereof, with their ends projecting beyond the side walls of the receptacle as at 8. Suitable side and central longitudinal extending members 9 rest on and are secured to the end members 7 with their terminal end portions 10 projecting beyond the ends of the receptacle. It will be apparent that the projecting terminal end portions of the frame members 7 and 9 prevent the placing of the receptacle against a solid wall surface, and also prevent the placing of packages, receptacles and other articles in contact with the side or end walls thereof in such a manner as to endanger or cut off the air circulation to the vent openings 5. The frame members 7 and 9 also provide a reinforcement for the cover 3, and the spacing of the members 9 from the cover prevents the closing of the vent openings in the cover by the placing of a package, receptacle or other article thereover, thus the frame as constructed, insures an air circulation around the receptacle at all times.

To control the vent openings 5, a suitable damper or gate 11 is provided, and the same is preferably in the form of a disk, formed with the triangular ports or openings 12 therein, adapted when the disk is adjusted to its full open position to expose the groups of vent openings as in Fig. 1 of the drawings. The damper rotates about a circular pivot 13 preferably extended through the center longitudinal frame member 9, and preferably secured to said damper and extending transversely thereof, is a central transverse frame member 14, which is also capable of pivoting on said pivot 13. Suitable limiting lugs or pins 14' are provided for controlling the arc of movement of the damper and the same are adapted to contact with the member 14 to limit its pivotal movement in either direction.

Auxiliary vent openings 15 are provided in the cover 3 to admit a limited amount of air into the compartments or pens of the receptacle, regardless of whether the damper is in open or closed position.

The cover may be retained in position on the receptacle in any suitable manner as by a suitable tie member (not shown) passed around a receptacle and over the reinforcing frame on the cover thereof.

By my construction I have provided an inexpensive receptacle for shipping young poultry, particularly chickens, and which is capable of withstanding rough usage, and by the employment of which the air circulation to the interior thereof is at all times insured and may be regulated. By this receptacle, I reduce to a minimum the danger of the live contents therein of becoming suffocated owing to the cutting off of the air supply thereto, and also the loss occasioned by undue exposure.

Having thus described my invention, what I claim is:

A shipping receptacle comprising a cover member having a wall formed with vent openings for admitting air to the interior of said receptacle, and an open frame attached to said wall and comprising a plurality of members with their ends projecting beyond the ends of said perforated cover wall, and disposed in angular relation to each other with the upper surface of certain members in a plane above the remaining members.

In testimony whereof I have signed my name to this specification in the presence of two subscribing witnesses.

FREDERICK W. DOBBEL.

Witnesses:
 B. BARDSON,
 R. F. COOPER.

Copies of this patent may be obtained for five cents each, by addressing the "Commissioner of Patents, Washington, D. C."